United States Patent
Ghare et al.

(10) Patent No.: US 11,057,264 B1
(45) Date of Patent: Jul. 6, 2021

(54) DISCOVERY AND CONFIGURATION OF DISASTER RECOVERY INFORMATION

(71) Applicant: Veritas Technologies LLC, Santa Clara, CA (US)

(72) Inventors: Shrikant Ghare, Maharashtra (IN); Arindam Mukherjee, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 11 days.

(21) Appl. No.: 14/882,955

(22) Filed: Oct. 14, 2015

Related U.S. Application Data

(60) Provisional application No. 62/104,046, filed on Jan. 15, 2015, provisional application No. 62/188,730, filed on Jul. 5, 2015, provisional application No. 62/234,779, filed on Sep. 30, 2015.

(51) Int. Cl.
*H04L 12/24* (2006.01)
*H04L 29/14* (2006.01)

(52) U.S. Cl.
CPC .......... *H04L 41/0672* (2013.01); *H04L 69/40* (2013.01)

(58) Field of Classification Search
CPC .............................. H04L 41/0672; H04L 69/40
See application file for complete search history.

(56) References Cited

U.S. PATENT DOCUMENTS

| | | | |
|---|---|---|---|
| 8,121,966 B2 | 2/2012 | Routray | 706/46 |
| 9,336,103 B1 | 5/2016 | Hasbe | |
| 10,146,636 B1 | 12/2018 | Ghare et al. | |
| 2009/0055689 A1* | 2/2009 | Petersen | G06F 11/2025 714/47.1 |
| 2009/0307166 A1* | 12/2009 | Routray | G06N 5/04 706/46 |
| 2011/0022879 A1* | 1/2011 | Chavda | G06F 11/0793 714/1 |
| 2011/0270802 A1 | 11/2011 | Benke | 707/636 |
| 2012/0278378 A1* | 11/2012 | Lehane | H04L 41/5051 709/201 |
| 2014/0006844 A1* | 1/2014 | Alderman | G06F 11/0793 714/4.1 |
| 2014/0189432 A1 | 7/2014 | Gokhale | 714/41 |
| 2015/0304167 A1* | 10/2015 | Farrell | H04L 41/085 709/221 |
| 2015/0317194 A1* | 11/2015 | Sampath | G06F 11/2023 714/703 |
| 2015/0378839 A1* | 12/2015 | Langouev | G06F 11/1464 714/19 |
| 2016/0062858 A1* | 3/2016 | Gallagher | G06F 11/2048 714/6.23 |
| 2016/0127466 A1* | 5/2016 | Albrecht | H04L 67/32 709/219 |
| 2016/0162906 A1* | 6/2016 | Irby | G06Q 30/018 705/317 |

(Continued)

*Primary Examiner* — Tonia L Dollinger
*Assistant Examiner* — Joseph M Cousins
(74) *Attorney, Agent, or Firm* — Campbell Stephenson LLP

(57) ABSTRACT

Various systems and methods related to disaster recovery (DR). For example, one method involves automatically discovering infrastructure information for one or more assets located in one or more primary sites and/or one or more recovery sites. The method also involves storing the infrastructure information in a database. The method also involves generating DR configuration information.

14 Claims, 15 Drawing Sheets

(56) References Cited

U.S. PATENT DOCUMENTS

2016/0191623 A1* 6/2016 Vasudevan ............ G06F 16/951
                                                       709/201
2017/0048314 A1* 2/2017 Aerdts .................. G06F 9/5083
2017/0308446 A1* 10/2017 Kanso ................. G06F 11/2048

* cited by examiner

DR Configuration Data
460

510 →

| Object | ="VM1" |
|---|---|
| Replication | ="Value 1" |
| Storage Stack | ="Value 2" |
| Network | ="Value 3" |
| IP | ="Value 4" |
| DNS | ="Value 5" |

•
•
•

| Object | ="Application N" |
|---|---|
| Replication | ="Value 6" |
| Storage Stack | ="Value 7" |
| Network | ="Value 8" |
| IP | ="Value 9" |
| DNS | ="Value 10" |

DISCOVERY AND CONFIGURATION OF DISASTER RECOVERY INFORMATION

CROSS-REFERENCE TO RELATED APPLICATIONS

This application claims the benefit under 35 U.S.C. § 119(e) of U.S. Provisional Patent Application No. 62/104,046 filed on Jan. 15, 2015, entitled "Management of and Data Recovery for Virtual Data Processing Systems," which is hereby incorporated by reference herein in its entirety. This application claims the benefit under 35 U.S.C. § 119(e) of U.S. Provisional Patent Application No. 62/188,730 filed on Jul. 5, 2015, entitled "Management of and Data Recovery for Virtual Data Processing Systems," which is hereby incorporated by reference herein in its entirety. This application claims the benefit under 35 U.S.C. § 119(e) of U.S. Provisional Patent Application No. 62/234,779, filed on Sep. 30, 2015, entitled "Discovery and Configuration of Disaster Recovery Information," which is hereby incorporated by reference herein in its entirety.

FIELD OF THE DISCLOSURE

The present disclosure relates generally to data protection, and more specifically to the protection of data across multiple networked sites.

BACKGROUND OF THE INVENTION

Computing systems and data are important resources that are often crucial to the operations of various types of organizations, such as business enterprises and governmental entities. Failures that affect the computing systems and data used by organizations may cause periods of unplanned downtime and data loss that could threaten an organization's productivity, reputation, and bottom line. Organizations are becoming increasingly aware of these risks and are taking measures to plan for and recover from such failures.

As modern computing environments become increasingly complex, adequately protecting these important resources can also become increasingly difficult. Consider, as an example, a data center that implements virtualization technology, various shared storage configurations, and multiple types of network access. In the event of some unplanned occurrence, such as a natural disaster, terrorist attack, or other catastrophic failure, protecting the computing systems and data in such an environment from unexpected unavailability often requires the knowledge and involvement of several different administrators or experts. Such coordination between several administrators can be time consuming, as well as prone to errors.

BRIEF DESCRIPTION OF THE DRAWINGS

The present disclosure may be better understood, and its numerous objects, features, and advantages made apparent to those skilled in the art by referencing the accompanying drawings.

FIG. 5 is a data structure, according to the present description.

Figure 1:
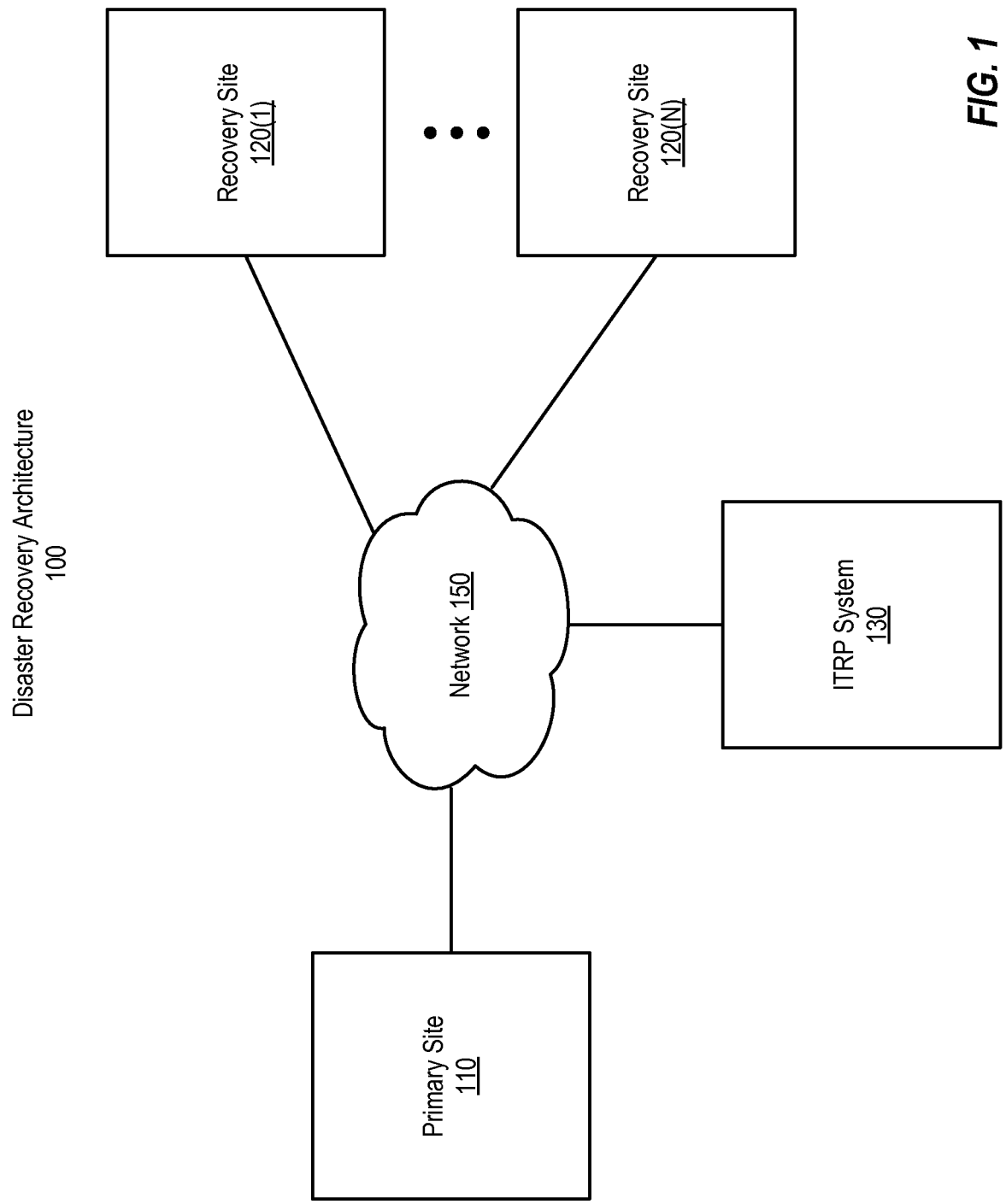
FIG. 1 is a block diagram illustrating certain components of an example computing environment, according to the present description.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Overview

Various systems and methods related to disaster recovery (DR) are disclosed. For example, one method involves automatically discovering infrastructure information for one or more assets located in one or more primary sites and/or one or more recovery sites. The method also involves storing the infrastructure information in a database. The method also involves generating DR configuration information.

Modern computing environments often include any number of applications and virtual machines, referred to herein as objects. Configuring these environments for disaster recovery (DR) typically involves ensuring that following a disaster or failure of some sort, some or all of the objects can be restarted a separate environment. Goals of DR include restarting the objects in a timely manner and preventing data loss. A DR operation typically involves one or more of the following: shutting down one or more objects in a primary site, and bringing down the assets associated with the one or more objects; and restarting the one or more objects in a recovery site, and ensuring that the assets used by the one or more objects are in place and properly configured to support the one or more objects. Configuring DR operations often involves many resources, or assets, other than the object being protected. These assets often belong to different domains, are provided by different vendors, and are maintained and managed by different administrators. A DR operation typically includes ordered processes by which these assets are taken offline at one site, known as a primary, or production site, and brought back online at another site, known as a recovery, or DR site. A list of which assets are used for DR of an object is typically maintained by a DR administrators. The list can be formatted as, for example, a database file or worksheet.

Generating the information used in performing DR operations can be a difficult task. Doing so involves the DR administrator learning which objects of the various objects in a site are DR enabled and identifying the assets upon which the DR enabled objects rely. The DR administrator records these dependencies, as well as information that correctly orders the dependencies. This information is used in establishing the proper sequence to bring assets and objects offline and online. In order to determine this information, the DR administrator typically communicates with various administrators, e.g., to get the correct names and identifiers for the assets, where each administrator is responsible for a subset or portion of the assets used by an object and needed to successfully protect the object in the event of a disaster. Moreover, the DR administrator typically maintains this information for a number of sites for each DR enabled object. These resources can be generally grouped into several layers, discussed below. These layers are considered when configuring and performing DR operations.

Application/Virtualization Layer

One layer that is considered when performing DR is known as an application or virtualization layer. This layer consists of objects, such as applications or virtual machines, that can be selected to be protected from disaster, known as being DR enabled. Configuring the application/virtualization layer for DR includes collecting information related to the objects, such as application names or identifiers, version information, information identifying the vendors that provide the objects, virtual machine identifiers, types, and the like.

Applications can include distributed applications and stand-alone applications. Example applications include, database applications, server applications, cluster applications, virtualization applications, storage management applications, networking applications, word processing applications, customer relations management applications, file system applications, and the like.

In addition to applications, or in the alternative, the objects at this layer can also include virtual machines. Using virtual machines to provide the functionality ordinarily provided by physical computing devices is known as virtualization and is becoming increasingly common. One benefit of virtualization is the simplification of data center management. In such environments, virtual machines can be used to extend the functional capabilities host computing devices therein provide. How effective the virtual machines are depends, to a large extent, on the configuration of the virtual machines, and the host(s) on which the virtual machines are implemented. Virtual machines are software constructs that can perform tasks typically associated with physical computing devices. Multiple virtual machines can be implemented on a single physical host, each virtual machine having its own operating system, and can operate independently of the other virtual machines. Thus, virtualization systems can allow multiple operating systems (which can actual be separate instances of the same type of operating system) to execute during the same time period on the same hardware. Each executing operating system acts as an independent "virtual machine" and can be interacted with and used in substantially the same manner as standalone operating system executing on independent hardware. Virtual machines allow increased usage of hardware resources by effectively turning one hardware computing device into several virtual machines.

When selecting a host node for a virtual machine, any dependencies that the virtual machine may have, e.g., with applications executed by other virtual machines, can be considered. Configuring a virtual machine can involve allocating and assigning space in one or more storage devices, network access, failover targets, and the like. Similarly, applications executed by the virtual machine are configured to effectively operate in virtualized environments. For example, a database program run by one virtual machine may depend on a web interface program run by another virtual machine. Therefore, the database program is configured to be able to locate and communicate with the virtual machine and/or host where the web interface program is implemented.

Setting up virtualization is often performed by a virtualization administrator. The virtualization administrator records configuration information and monitors performance of objects involved in virtualization, e.g., virtual machines.

Storage Layer

Another layer that affects DR configuration is known as a storage layer. There exist various types of storage and providers of storage. A site can utilize physical storage, logical storage, virtual storage, or some combination of all of the above. Setting up storage stacks, including organizing and controlling access to storage, is often performed by a storage administrator. The storage administrator records configuration information and monitors performance of objects involved in storage. Storage configuration information can include, for example, mount points, volume IDs, file system type, volume group IDs, datastore name/ID, and the like.

Network

DR configuration also involves information pertaining to a network layer. Various objects within a site can be communicatively coupled to each other and to devices outside the site. Setting up networking is often performed by a network administrator. The network administrator records configuration information and monitors performance of resources involved in networking. Network configuration information can include, for example, virtual machine port groups, virtual switches, MAC IDs, IP addresses and masks, gateway and DNS settings, and the like.

Replication

Another layer that affects DR configuration is known as a replication layer. An object, such as an application or virtual machine, in a primary site can be configured to use replication. That is, data associated with (e.g., such as data that is used, created, or owned by) the object can be replicated from one storage device to another. Such replication can be synchronous and/or asynchronous and can be intra-site and/or inter-site. Example types of replication include hypervisor-based replication, block-based replication, and host-based replication, to name a few. These replication relationships can be complex, and are often set up and monitored by a replication administrator. Replication efficiency, e.g., preventing unnecessary replication operations while still keeping all replicas up to date and ensuring efficient use of network bandwidth, can be an involved task. Replication configuration information includes, for example, replication information associated with one or more applications or virtual machines such as information that identifies one or more replicated volumes, replication consistency groups, replication hardware, replication array credentials, replication modes, replication schedules, and the like. If a DR operation occurs, the replication configuration established for a primary site should be preserved and re-established at the recovery site.

The four layers discussed above represent arbitrary divisions or organizations of information regarding resources used to implement objects in a primary site and protect those objects by performing a DR operation to a recovery site. Other types of information and other organizational schemes also fall within the scope of this disclosure, and the DR operations described below are not limited by any particular conceptual organization of such configuration information.

Disclosed herein are systems and methods that, among other inventive and useful applications, automatically discover all information needed to perform a DR operation. The information gathered applies to environments with heterogeneous vendors, technology, and topologies. The information is gathered and stored in a uniform format. The uniformly formatted information is available such that if a DR operation is to be performed, it can proceed with the push of a button, without undergoing the process of soliciting manual input from various administrators. The present disclosure not only improves the efficiency with which DR operations are configured, but also reduces the likelihood of error by automatically generating and providing a single unified source of configuration information.

FIG. 1 shows a computing environment configured to perform DR operations that involve one or more of the layers discussed above. As shown in FIG. 1, disaster recovery architecture 100 includes primary site 110, recovery sites 120(1)-120(N) (collectively referred to as recovery sites 120), and information technology resiliency platform (ITRP) system 130. These elements are coupled to one another via network 150. Network 150 can include a WAN (Wide Area Network), such as the Internet, one or more LANs (Local Area Networks), and/or one or more SANs (Storage Area Networks). As used herein, the term site, whether applied to primary or recovery, refers to one or more computing devices, such as hosts and storage devices, that are coupled to one another via a high-speed communications medium, such as a local area network, as well as various software assets implemented by the computing devices. The computing devices of a site are generally located within a single geographic area, such as a single building or in multiple buildings in a single campus. The distance between computing devices of a single site is relatively small as compared to the distance between sites.

It will be noted that the variable identifier "N" is used to more simply designate the final element (e.g., recovery site 120(N)) of a series of related or similar elements (e.g., recovery sites). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Figure 2:
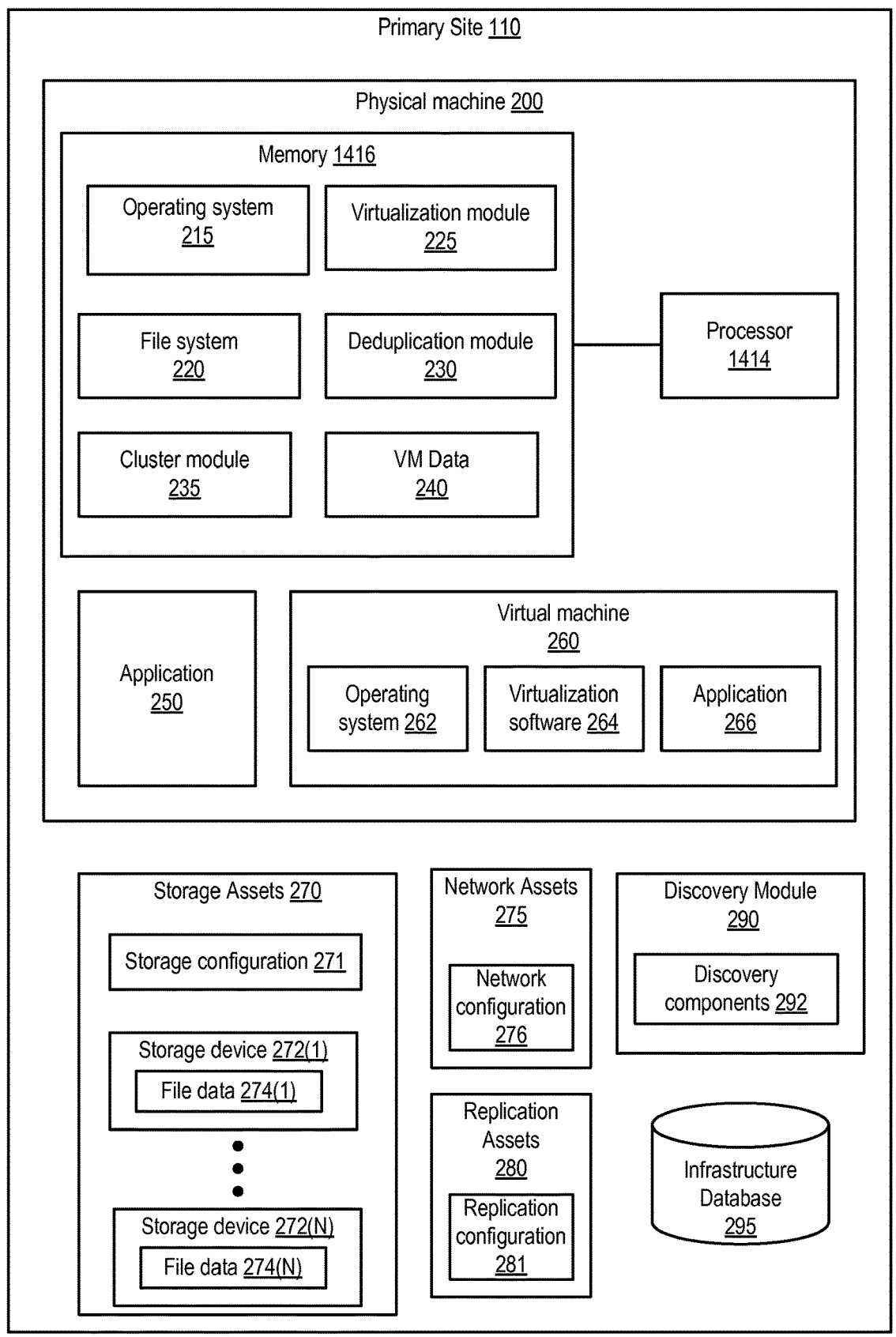
FIG. 2 is a block diagram illustrating certain components of an example computing environment, according to the present description.

Primary site 110, described in greater detail with regard to FIG. 2, includes one or more objects, such as applications or virtual machines, that can be DR enabled. For example, if a disaster occurs that effects one or more objects at primary site 110, the objects of primary site 110 can be restarted in one or more of recovery sites 120, which are described in greater detail with regard to FIG. 3. DR operations are intended to prevent data loss and extended periods of inaccessibility to the objects. Since primary site 110 is geographically remote from recovery sites 120, the likelihood of a single disaster affecting both primary site 110 and recovery sites 120 is low. ITRP system 130, which includes one or more ITRP servers, as described in greater detail with regard to FIG. 4, provides disaster recovery capabilities for objects, such as virtual machines and/or various applications, which might be executed in primary site 110. This involves configuring the objects and resources in primary site 110 as well as resources in the recovery sites 120. ITRP system 130 provides the potential to add new capabilities to one or more of primary site 110 and recovery sites 120 on demand. Doing so leverages automatic/assisted discovery of assets to reduce administrator configuration errors, and leverages workflows in a novel manner to provide customization and extensibility to one or more of primary site 110 and recovery sites 120.

FIG. 2 shows additional details of primary site 110, also known as a production site. Primary site 110 is configured to run one or more objects, such as applications or virtual machines. The assets of primary site 110 are co-located in a single geographic location, in some embodiments. Primary site 110 can be for example a data center, and can include one or more computing systems located in one or more buildings. Primary site 110 can be as small as a single computer or as large as a data center that includes thousands of computing devices. As shown, primary site 110 includes a single physical machine 200, sometimes referred to as a host. It should be understood that multiple physical machines, such as physical machine 200, can be included in primary site 110. Primary site 110 also includes storage assets 270, network assets 275, replication assets 280, discovery module 290, and infrastructure database 295.

Physical machine 200 is a computing device such as a personal computer, laptop computer, server, personal digital assistant, cell phone, or the like. Physical machine 200 includes a memory 1416 and a processor 1414. Physical machine 200 also includes an application 250 and a virtual machine 260. While a single application and virtual machine are shown, physical machine 200 can include more or fewer applications and virtual machines.

Memory 1416 includes an operating system 215. Operating system 215 controls the hardware of physical machine 200 and provides various services to applications and virtual machines executing on physical machine 200. For example, when a virtual machine 260 requests a page be brought into memory 1416, the operating system can relay the request to file system 220, which can request that the page be read, e.g., from file data 274 of storage device 272. File system 220 can receive the page and write the page to memory 1416, e.g., to virtual machine data 240. File system 220 can organize data storage devices 272 into files and directories. File system 220 can also maintain a listing of the physical locations of files and data in storage assets 270.

Memory 1416 includes a deduplication module 230. Deduplication module 230 can perform deduplication operations related to memory 1416, including virtual machine data 240. When a specified unit of data, e.g., a page, is to be loaded into memory 1416, deduplication module 230 determines whether a unit of data containing identical data already exists in memory 1416, e.g., the data may have been requested by another virtual machine hosted on physical machine 200. If the unit of data is already present, rather than store the data, thus resulting in multiple copies of the same data stored in memory, deduplication module 230 creates a pointer to the existing copy of the unit of data, increases a reference count associated with the existing copy of the unit of data, and prevents the specified unit of data from being stored again in memory 1416. The pointer can redirect a subsequent request to access the unit of data (e.g., by the virtual machine that requested the unit of data be loaded) and incrementing a reference counter that indicates how many entities (e.g., virtual machines) have an interest in the data. The deduplication operation is transparent to the virtual machine that requested the unit of data be loaded and the virtual machine can use the unit data that is already present in memory as though the load request were fulfilled.

In an embodiment, deduplication module 230 is notified by file system 220 of the page request. To determine whether the page already exists in memory, deduplication module 230 calculates a signature, e.g., fingerprint, for the page and compares the fingerprint with a list of fingerprints stored in virtual machine data 240. If the fingerprint exists in the list, the page is redundant, and deduplication module 230 notifies file system 210 to cancel the load. If the fingerprint is not found, the page is not already stored in virtual machine data 240 and deduplication module 230 adds the fingerprint to the list of fingerprints and allows the load to proceed. Virtual machine data 240 includes data used by virtual machine 260, as well as a list of fingerprints for the data.

Memory 200 includes virtualization module 225. Virtualization module 225 performs operations related to creation and management of virtual machines and resources for virtual machines. Virtualization module 225 is illustrated as a stand-alone module but can also be included in operating system 215. Virtualization module 225 provides physical machine 200 the ability to concurrently support one or more virtual machines, such as virtual machine 260. Virtualization module 225 provides this ability by coordinating the distribution of computer resources (e.g., processing power, memory, etc.) to the virtual machines so that the virtual machines operate similarly to physical computers. Virtualization module 225 can be designed to support virtual machines by coordinating processor resources to support the execution of instructions on behalf of the virtual machines, and performing memory management to help ensure that the virtual machines effectively share the host computer's system memory.

Memory 1416 includes a cluster module 235. In an embodiment, it is desirable to make a placement decision for multiple virtual machines at once. In this embodiment, a placement server, e.g., ITRP system 130 of FIG. 1, can form clusters of similar virtual machines, where similarity is defined by the number of duplicate pages shared by the virtual machines. The duplicate pages can be due to various factors, e.g., the virtual machines running a common operating system or a common application or processing the same data. This data may be data that is included in the virtual machines themselves, or stored outside the virtual machines, e.g., in file data 274. The ITRP server can then select a physical machine and place a cluster of virtual machines on the selected physical machine. The sizes of a cluster can depend on various factors, such as available resources on each physical machine, resource requirements of the virtual machines, and the like. Various algorithms can be used for clustering. For example, the ITRP server can create clusters using a K-means algorithm, hierarchical clustering, or a probabilistic clustering algorithm. The distance metric generally used for clustering can be considered as inversely proportional to number of common memory pages. That is, more common pages means lesser distance between two virtual machines, and hence more chance of the virtual machines falling into same cluster.

Physical machine 200 includes application 250. While only one application is shown in FIG. 2, it is understood that physical machine 200 can run multiple applications. Application 250 can be any of a word processing program, email program, graphic editing program, database application, server program, or the like.

Physical machine 200 includes virtual machine 260. While only one virtual machine is shown in FIG. 2, it is understood that physical machine 200 can host multiple virtual machines. In general terms, virtual machine 260 is a software construct that acts as a physical computer system. For instance, virtual machines can include and execute applications, such as application 266, provide services, and process commands. A virtual machine has its own operating system 262, such as Microsoft Windows® or Unix, and can include virtualization software 264 and/or interface with virtualization software on a host, such as is provided virtualization module 225 on physical machine 200.

Storage assets 270 can be included in whole or in part in one or more physical machines, such as physical machine 200 and/or can be coupled to one or more physical machines via a LAN or other communications media. Storage assets 270 include storage devices 272(1)-272(N), collectively referred to as storage devices 272. Storage devices 272 provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Storage devices 272 are configured to store data, such as file data 274. File data 274 is configured to be accessed by application 250 and virtual machine 260. Data 274 represents one or more of any logical or physical unit of data, such as a file system, a file, a database, a volume, a block, an extent, a disk drive, or the like.

Storage assets 270 also include storage configuration component 271. Storage configuration component 271 can be implemented as one or more software modules or applications configured to be used by a storage administrator to manage storage assets 270. Managing a storage system involves, for example: creating logical groupings, such as volumes, virtual drives, shared storage spaces, and the like; setting permissions; controlling access; organizing data; and monitoring and reporting on the health, utilization, and availability of the storage devices included in the storage system. Storage configuration component 271 is also configured to store information regarding the storage systems managed by storage configuration component. Such information typically includes, for example, information regarding the configuration, capabilities, and utilization of the storage systems, and the storage devices therein.

Primary site 110 also includes network assets 275. Network assets 275 include physical networking assets, such as switches, bridges, DNS servers, gateways, and network interface cards, and/or virtual networking assets such as virtual switches, virtual machine port groups, and the like. The network assets include the hardware and software elements that determine how elements of a site, such as physical machine 200, communicate with each other, and how the site communicates with the outside world, such as other sites. Network configuration component 276 can be implemented as one or more software modules or applications configured to be used by a network administrator to set up and monitor the site's network assets. Network configuration component 276 stores network configuration information specifying the network assets configured for the site.

Primary site 110 also includes replication assets 280. Replication assets 280 include software and hardware elements used to transfer data, such as file data 274, from one site to one or more other sites. Replication is configured by a replication administrator using replication configuration component 281. Replication configuration component 281 can be implemented as one or more software modules or applications. Replication configuration component 281 stores information identifying replication assets associated with each object for which replication is enabled. For example, replication configuration component 281 can include information identifying one or more replicated volumes, replication consistency groups, replication hardware, replication array credentials, replication modes, replication schedules, and the like.

Primary site 110 also includes discovery module 290. Discovery module 290 is configured to collect information about the assets, or resources, present in primary site 110. For example, discovery module 290 determines what objects are included in primary site 110, what storage assets are included in primary site 110, what network assets are included in primary site 110, and what replication assets are included in primary site 110, and stores information regarding these assets in infrastructure database 290. Discovery module includes one or more discovery components 292. In one embodiment, discovery components 292 include vendor-specific plug-ins. Each vendor-specific plug-in is configured to identity software and/or hardware associated with a specific vendor. Each discovery component 292 can also be associated with a particular category, or layer, of assets. For example, one or more of discovery components 292 can be categorized as storage asset discovery components, etc. Discovery module 290 collects, for each object, such as application 250 or virtual machine 260, information regarding the assets the object depends on. For example, if a particular virtual machine is configured to store data in a particular volume, discovery module 290 discovers this information. For each object, discovery module 290 stores the information regarding the objects dependencies and the assets used by the object in a uniform format. The uniform format provides all the information needed to protect the object against disaster. The information is stored in infrastructure database 295. For example, for a given object, information regarding the object's storage stack, replication properties, and network configuration is stored. Discovery module 290 discovers this information for each object in primary site 110, or for a subset of objects, such as objects that have been selected for DR protection, and stores the information in a uniform format. The information can later be used by a DR administrator to configure DR for the object.

Figure 3:
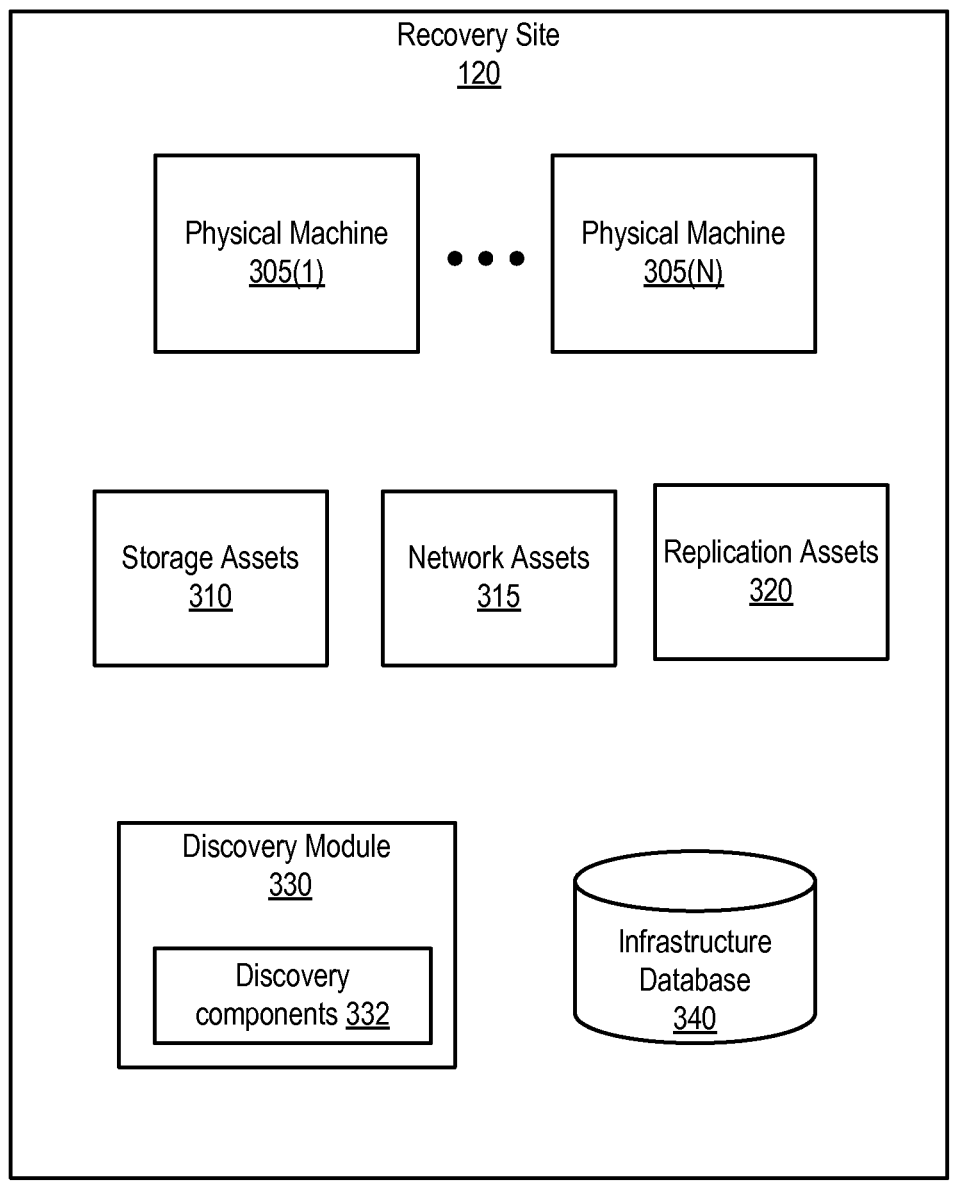
FIG. 3 is a block diagram illustrating certain components of an example computing environment, according to the present description.
Figure 4:
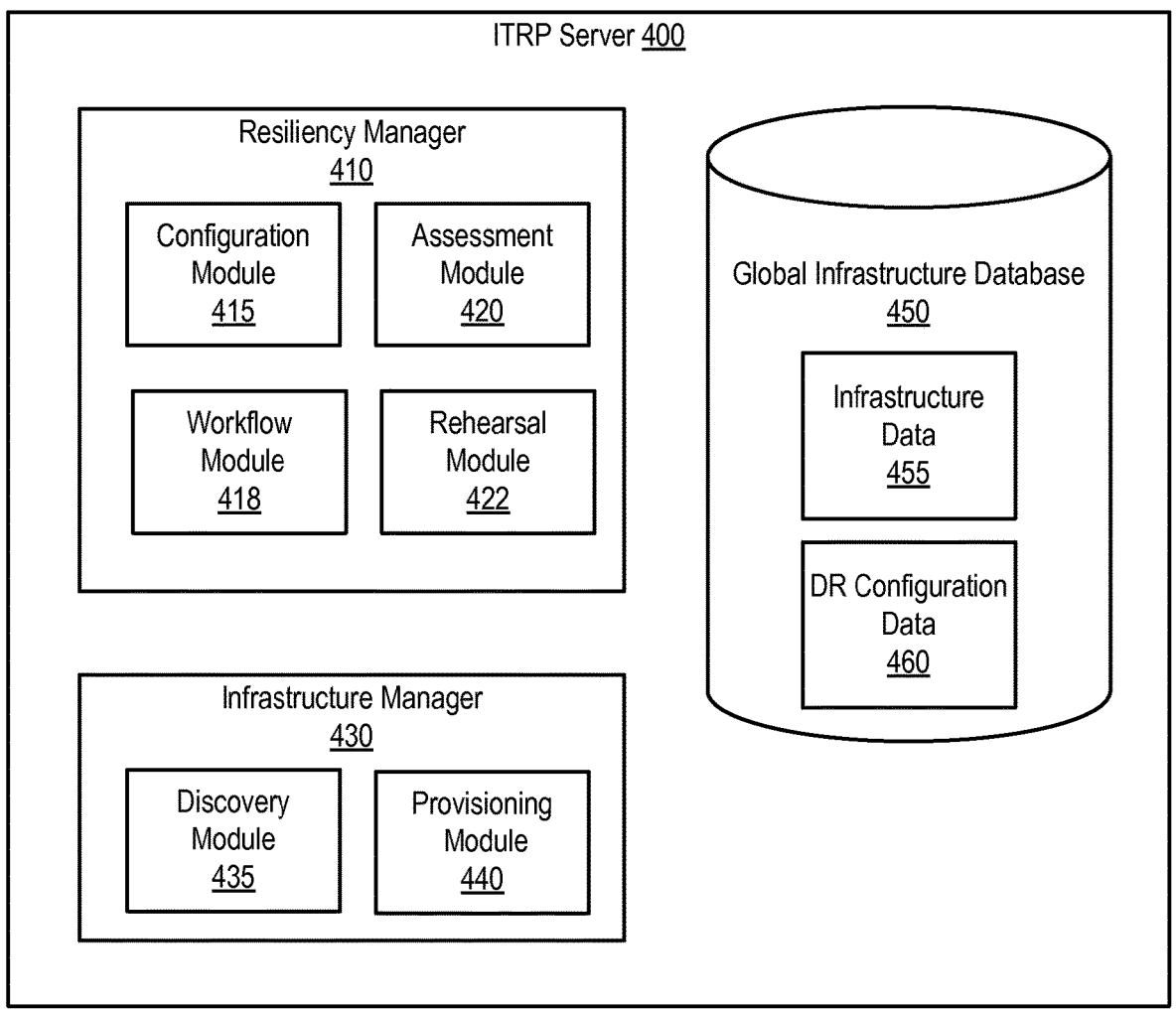
FIG. 4 is a block diagram illustrating certain components of an example computing environment, according to the present description.

FIG. 3 shows additional details of an example one of recovery sites 120 of FIG. 1. Recovery site 120 is configured to recover one or more objects, such as applications or virtual machines, as part of a DR operation. Recovery site 120 includes one or more physical machines 305 through 305(N), referred to collectively as physical machines 305. Physical machines 305 are physically comparable to physical machine 200 of FIG. 2, and a more detailed description of the characteristics of physical machines 305 is omitted for the sake of brevity. Recovery site 120 also includes storage assets 310, network assets 315, and replication assets 320. These assets are configured to perform the same or similar functions as their counterparts on primary site 110.

Recovery site 120 also includes discovery module 330 and infrastructure database 340. Discovery module 330 includes discovery components 332 which can be implemented as vendor-specific plug-ins. Discovery module 330 determines the capabilities of recovery site 120 for performing disaster recovery. For example, discovery module 330 discovers the replication, storage, network, and virtualization characteristics of the hardware and software present at recovery site 120. Discovery module 330 formats this information in a uniform format and stores the information in infrastructure database 340.

FIG. 4 shows additional details of an information technology resiliency platform server 400, such as could be included in ITRP system 130 of FIG. 1. ITRP server 400 is a computing device such as a personal computer, laptop computer, server, personal digital assistant, cell phone, or the like, and is configured to set up and manage assets at one or more sites, as well as to configure and execute DR operations. ITRP server 400 includes resiliency manager 410, infrastructure manager 430, and global infrastructure database 450.

Infrastructure manager 430 includes discovery module 435 and provisioning module 440. Provisioning module 440 can configure assets at one or more sites. For example, provisioning module 440 can assign volume names, allocate resources, configure objects, and the like. In one embodiment, provisioning module provisions an object, such as an application or virtual machine. If the site in which the object is being provisioned includes multiple physical machines, provisioning module 440 selects which physical machine the object should run on. This involves, in one embodiment, accessing object configuration information and resource requirements. In certain situations, such provisioning is controlled by a service level agreement (SLA), which defines the requirements of the object, and which can include object configuration, such as both resource requirements and additional requirements. Resource requirements such as physical requirements of a host where this object can be provisioned. These resource requirements can include CPU, memory, and/or other hardware requirements. The resource requirement(s) indicate resource(s) needed in a physical machine for hosting the object. As a result, the object can be provisioned on a physical machine that has the resources specified by the resource requirements of the SLA associated with this object.

The additional requirements indicate operational element(s) needed in a physical machine for hosting the object. For example, these additional requirements can include availability requirements, data protection requirements, and security requirements, among others. The availability requirements can define the object availability requirement(s). The data protection requirement(s) can indicate data protection elements needed in a potential physical machine for hosting the object. The security requirement(s) can indicate security elements needed in the potential physical machine for hosting the object. The operation element(s) can indicate data protection elements needed in a potential physical machine for hosting the object. Object configuration information can include resource requirement(s), and one or more additional requirement(s).

Discovery module 435 discovers configuration of assets located at one or more primary sites and/or recovery sites. In one embodiment, this involves coordinating with discovery modules located at the sites, such as discovery module 290 of FIG. 2. In one embodiment, discovery module 435 accesses configuration information in the local databases at those sites, and retrieves the configuration information and stores the configuration information in infrastructure data 455 of global infrastructure database 450. Global infrastructure database 450 can be stored outside of any of the sites. This decreases the likelihood of a disaster affecting both a primary site and the global infrastructure database. In one embodiment, a copy of the global infrastructure database is stored at each site, and the contents are replicated between each copy of the global infrastructure database.

Resiliency manager 410 also includes configuration module 415, workflow module 418, assessment module 420, and rehearsal module 422. Configuration module 415 selects one or more objects to be configured for disaster recovery. For example, configuration module 415 can detect user input indicating that one or more specific objects should be protected. In one embodiment, configuration module 415 selects all objects to be protected or selects a subset (less than all objects) to be protected based on one or more selection criteria, such as type of object, or the like.

Assessment module 420 identifies the assets used by objects being configured for DR, and the dependencies the objects have upon those assets. Assessment module 420 generates a list of all the assets involved in performing a DR operation for each DR enabled object, and stores the list in DR configuration data 460. In one embodiment, generating the list involves assessment module 420 performing a series of queries of the global infrastructure database, specifically of the infrastructure data stored therein. Assessment module 420 also determines whether there are any issues or errors with the configuration of an object or site, or the assets associated with the object or site, that could prevent a DR operation from completing successfully.

Workflow module 418 generates a sequence of steps involved in performing a DR operation. Rehearsal module 422 generates additional steps involved in performing a rehearsal of a DR operation. In one embodiment, generating workflows for DR operations and DR rehearsal operations involves accessing DR configuration data 460 stored in global infrastructure database 450. Workflow module 418 and rehearsal module 422 can automatically generate workflows, or run books, using this configuration information without soliciting user input from various administrators.

FIG. 5 shows additional details of DR configuration data 460. DR configuration data 460 includes information identifying assets at one or more of a number of layers associated with configuring and performing DR operations. In one embodiment, this information is formatted in a uniform format that facilitates DR configuration across diverse virtual technologies using heterogeneous storage and replication technologies. The configuration data includes, in one embodiment, one or more groupings of data known as DR blobs. Each DR blob includes configuration information for a particular object. For example, DR blob 510 includes DR information for a first virtual machine, VM1. DR blob 515 includes DR configuration information for an Application N.

As can be seen, the DR blobs store DR configuration information in a uniform format. For each layer, each DR blob indicates what (if any) assets are configured for the object associated with the DR blob.

Figure 6:
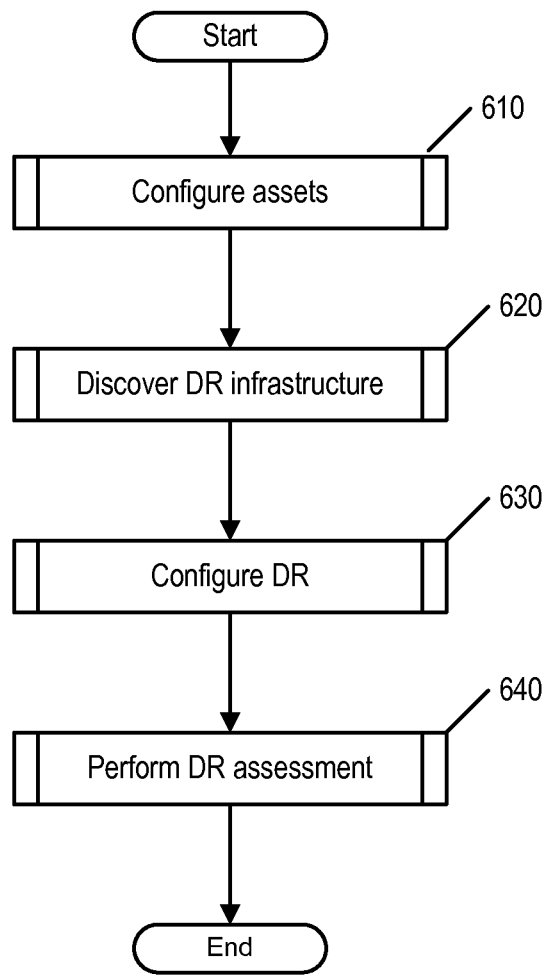
FIG. 6 is a flowchart illustrating an example process, according to the present description.

FIG. 6 is a flowchart illustrating an example process for discovering and utilizing infrastructure configuration information for DR operations. The processes shown in FIG. 6, and in the remaining FIGS. 7-13, may be modified in order to derive alternative embodiments. Also, the steps in these figures are shown in sequential order. However, certain steps may occur in a different order than shown, certain steps may be performed concurrently, certain steps may be combined with other steps, and certain steps may be absent in another embodiment.

In one embodiment, the operations shown in FIG. 6 are performed by an ITRP system, such as ITRP system 130 of FIG. 1. The elements shown in FIG. 6 are performed in response to detecting a stimulus. A few examples of such stimuli are: user input requesting DR configuration; detection that a period of time has expired; implementation of a new object; and detection of a change of state with regard to some computing resource, such as bandwidth, storage, or processing resources exceeding a specified threshold. At 610, the ITRP system configures assets. This can involve installation and configuration of any type of computing resource, such as virtual machines, applications, replication assets, storage assets, network assets, and the like. The ITRP system can configure assets in each of multiple sites. Additional details of configuring assets are discussed with regard to FIG. 7.

At 620, the ITRP system discovers DR infrastructure. Discovering DR infrastructure involves communicating with one or more discovery modules at one or more sites, such as primary site 110 of FIG. 2 and recovery site 120 of FIG. 3. Additional details of discovering DR infrastructure are discussed with regard to FIG. 8. At 630, the ITRP system configures DR. In one embodiment, this involves determining which objects are to be protected. Additional details of configuring DR are discussed with regard to FIG. 10. At 640, the ITRP system performs DR assessment. DR assessment involves determining which assets are depended upon by the objects being configured for DR. Additional details of performing DR assessment are discussed with regard to FIG. 11.

Figure 7:
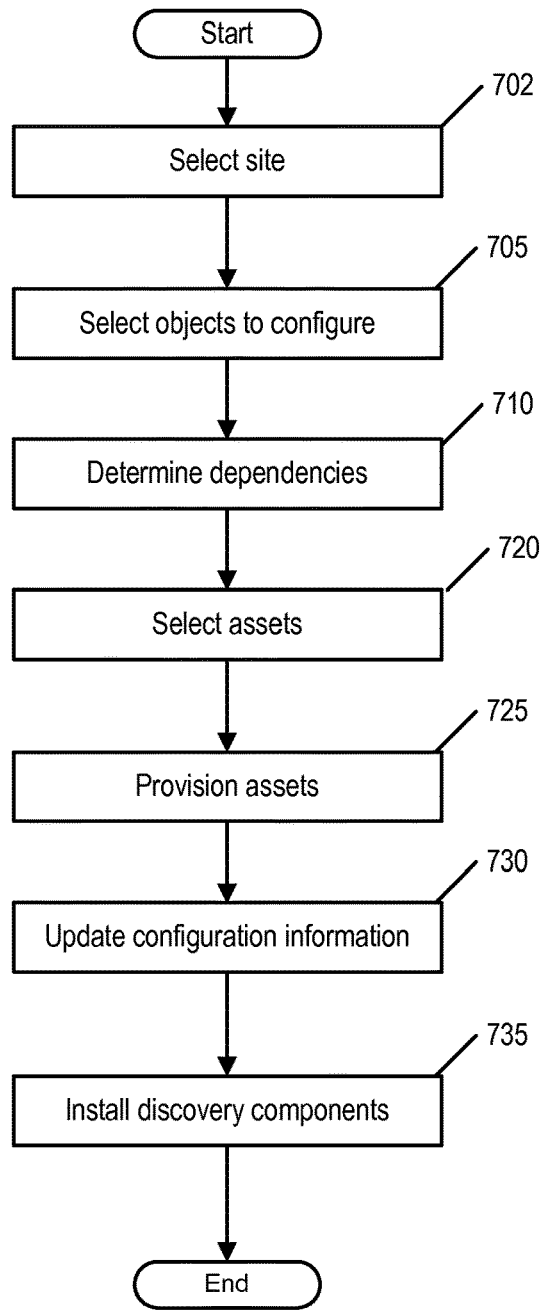
FIG. 7 is a flowchart illustrating an example process, according to the present description.

FIG. 7 is a flowchart illustrating an example process for configuring objects and/or assets. In one embodiment, the operations shown in FIG. 7 are performed by a provisioning module, such as provisioning module 440 of FIG. 4. At 702, the provisioning module selects a site, such as one of primary site 110 of FIG. 1 or one of recovery sites 120 of FIG. 1. In one embodiment, the provisioning module receives input from a user indicating that the site has one or more assets that need provisioning. Alternatively, the provisioning module can automatically select a site in response to detecting the occurrence of an event, such as a change to the site or expiration of a time period. For example, the provisioning module can periodically traverse a list of all sites and determine, for each site, whether the site includes assets that should be configured. In another embodiment, the provisioning module selects the site based on determining that an asset has been added to the site, removed from the site, or has undergone a state change, e.g., brought from offline to online or from passive to active.

After selecting the site, the provisioning module selects, at 705, one or more objects to configure. An object, can be for example, a virtual machine or an application. In one embodiment, the selection is based upon receiving user input indicating which applications or virtual machines the user would like to have set up. In one embodiment, the selection is automatic, for example, a default configuration can be applied. In another embodiment, there are no objects to be provisioned, but there are assets to be configured. In such an embodiment, the method begins at 720. In embodiments in which objects are to be configured, the provisioning module determines, at 710, any dependencies for the one more objects being configured. For example, if a virtual machine is being configured, the provisioning module determines what assets, such as storage, are used by the virtual machine.

At 720, the provisioning module selects the assets that will be configured. For example, if an application specifies a minimum amount of storage to run properly, the provisioning module selects one or more physical or logical storage assets that can satisfy the application's specified minimum amount of storage. Selection of which asset will be used can be based on or more criteria. For example, the provisioning module can select the best available asset, e.g., fastest storage or highest bandwidth transmission medium. In another embodiment, the provisioning module determines a priority associated with the object, and select assets according to the priority of the object.

At 725, the provisioning module provisions the asset(s) selected at 720. For example, the provisioning module can assign a drive name or volume name, can reserve storage, and the like. At 730, the provisioning module updates configuration information. For example, the provisioning module updates a list, or database file, indicating which assets are configured for the site. At 735, the provisioning module installs discovery components. In one embodiment, this involves installing a discovery module, such as discovery module 290 of FIG. 2, and one or more discovery components, such as discovery components 292 of FIG. 2. Discovery components are implemented, in one embodiment, as vendor specific plug-ins.

Figure 8:
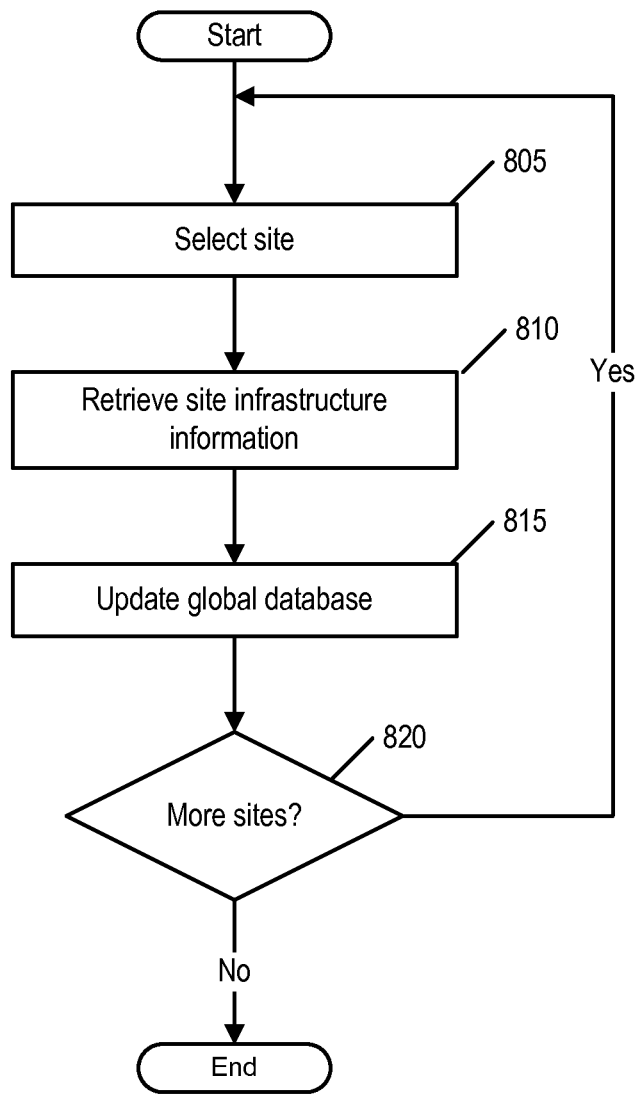
FIG. 8 is a flowchart illustrating an example process, according to the present description.

FIG. 8 is a flowchart illustrating an example process for discovering information, such as DR configuration information, across one or more sites. The operations of FIG. 8 can be performed by a discovery module, such as discovery module 435 of FIG. 4. In one embodiment, the discovery module is included in an information technology resiliency platform server, such ITRP server 400 of FIG. 4.

At 805, the discovery module selects a site, such as one of primary site 110 of FIG. 2 or recovery site 120 of FIG. 3. In one embodiment, the discovery module receives input from a user indicating that the user wishes to discover DR configuration for the site. Alternatively, the provisioning module can automatically select a site in response to detecting the occurrence of an event, such a change to the site or expiration of a time period. For example, the discovery module can periodically traverse a list of all sites, where the list is generated by the discovery module.

At 810, the discovery module retrieves configuration information the site selected at 805. In one embodiment, this involves transmitting a request to the site. A discovery module at one of these sites, such as discovery module 290 of FIG. 2, can receive and respond to the request. For example, the discovery module can extract information from a local infrastructure database included at the site, and send the information to the ITRP's discovery module. In one embodiment, the discovery module retrieves configuration information on an object by object basis. For example, the discovery module can send a message requesting information for one or more specific objects. The discovery module can, in other embodiments, request all information (e.g., for all objects and assets), or all information for a particular layer (e.g., replication). In one embodiment, the discovery module at the site automatically generates a message including the information and transmits the information to the ITRP. The site's discovery module can send the information periodically, or in response to detecting an event, such as a configuration change.

In response to receiving the information, the discovery module updates a global database at 815. In one embodiment, this involves extracting information from one or more messages and updating one or more uniform data structures in the global database. At 820, the discovery module determines whether there are more sites for which infrastructure information should be gathered. If so, the method returns to 805.

Figure 9:
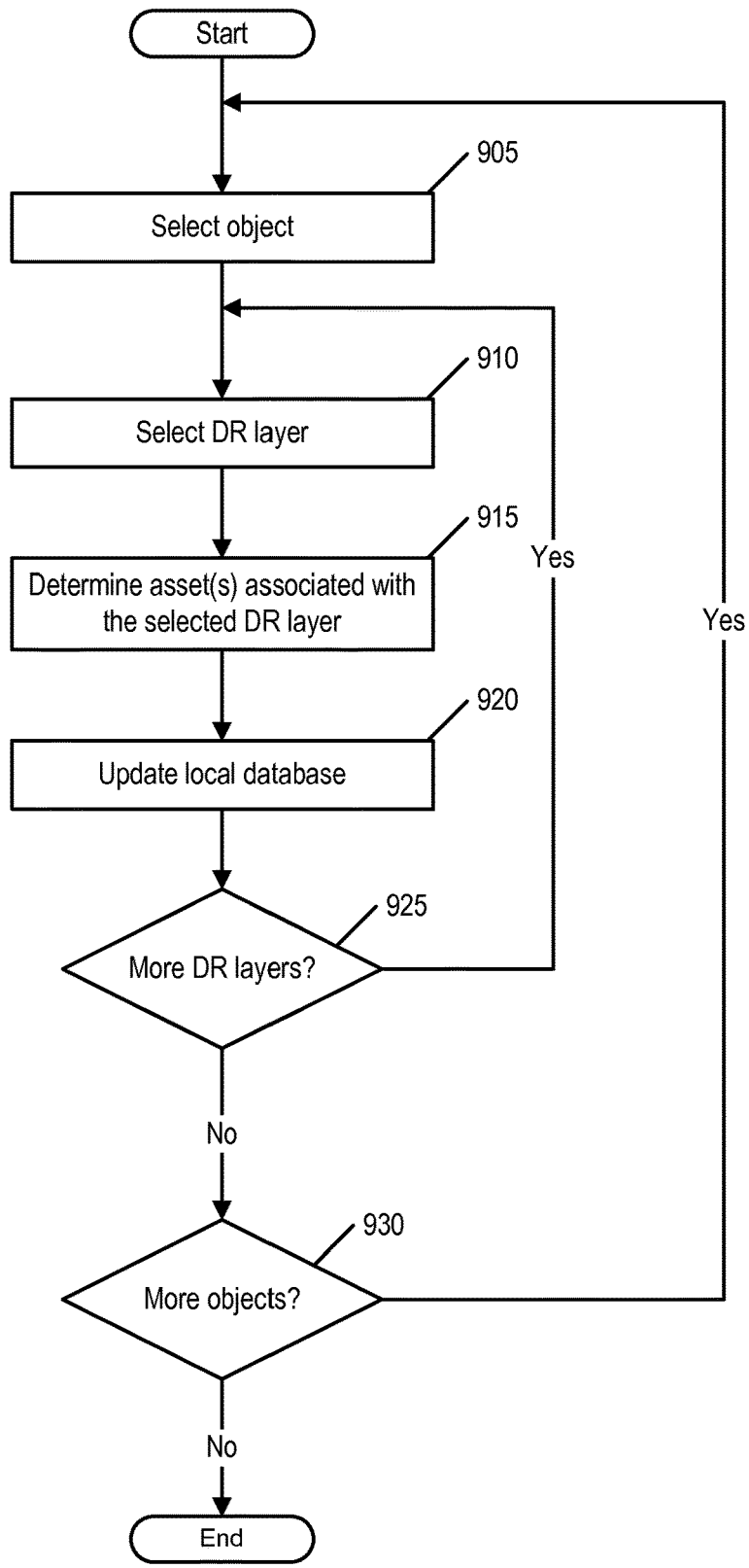
FIG. 9 is a flowchart illustrating an example process, according to the present description.

FIG. 9 is a flowchart illustrating an example process for discovering information, such as DR configuration information, within a site. The operations shown in FIG. 9 can be performed by a discovery module, such as discovery module 290 of FIG. 2. At 905, the discovery module selects an object. In one embodiment, the discovery module traverses a list of all objects included in a site, such as primary site 110. In another embodiment, a discovery module determines which objects of the primary site are to be configured for disaster recovery. For example, the discovery module can detect user input indicating which objects are to be protected.

At 910, the discovery module selects a DR layer. In order to perform DR, there are several layers that are involved, such as replication, storage, virtualization, and network settings. At 910, the discovery module selects one of the layers. The selection can be arbitrary, e.g. a sequential traversal of each layer, or can be automatically performed in response to a determination that an event has occurred, such a configuration change that affects the selected layer, or the expiration of a specified time period since a previous discovery operation was performed for the selected layer.

At 915, the discovery module determines assets associated with the selected DR layer for the selected object. For example, if the selected DR layer is replication, and the selected object is a virtual machine, the discovery module determines replication settings associated with the virtual machine. Discovering the assets is performed using one or more vendor specific plug-ins, such as are included in discovery components 282 of FIG. 2. In one embodiment, discovery module modifies an algorithm used to discover information based on previously discovered information. For example, if a particular storage asset is discovered, the discovery module can limit its discovery operations to assets at the other layers that are known to be compatible with the discovered storage asset.

At 920, the discovery module updates a local infrastructure database. In one embodiment, updating the local infrastructure database involves formatting information collected by the vendor specific plug-ins in a uniform manner. Formatting this information involves storing the information in a format that is vendor-agnostic, and that can be consumed by a DR orchestrator.

At 925, the discovery module determines whether there are more DR layers for which information should be gathered for the selected object. If so, the method returns to 910. Otherwise, the discovery module determines, at 930, whether there are more objects in the site that are being configured for DR. If so, the method returns to 905.

Figure 10:
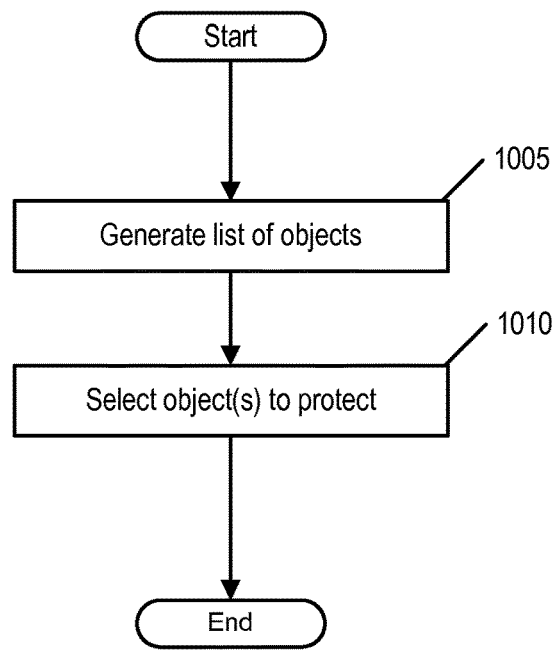
FIG. 10 is a flowchart illustrating an example process, according to the present description.

FIG. 10 is a flowchart illustrating an example process for configuring a DR operation for a site, such as primary site 110 of FIG. 2. The operations shown in FIG. 10 can be performed by a configuration module, such as configuration module 415 of FIG. 4. At 1005, the configuration module generates a list of objects present in the site, such as primary site 110. In one embodiment, the configuration module accesses infrastructure data stored in a global infrastructure database, such as infrastructure data 455 stored in global infrastructure database 450 of FIG. 4. The configuration module determines, using the infrastructure data, which objects are present in the site, regardless of the type of object or vendor that provides the object.

At 1010, the configuration module selects which of the objects to protect. For example, a configuration module can receive user input identifying one or more of the objects as targets to be protected for disaster recovery. In some embodiments, the configuration module can automatically select one or more objects based on determining that the objects satisfy some criteria, for example a priority associated with the object or the type of object. For example, the configuration module can be programmed to automatically select each VM present to be protected, but only to select those user applications that have been designated as critical.

Figure 11:
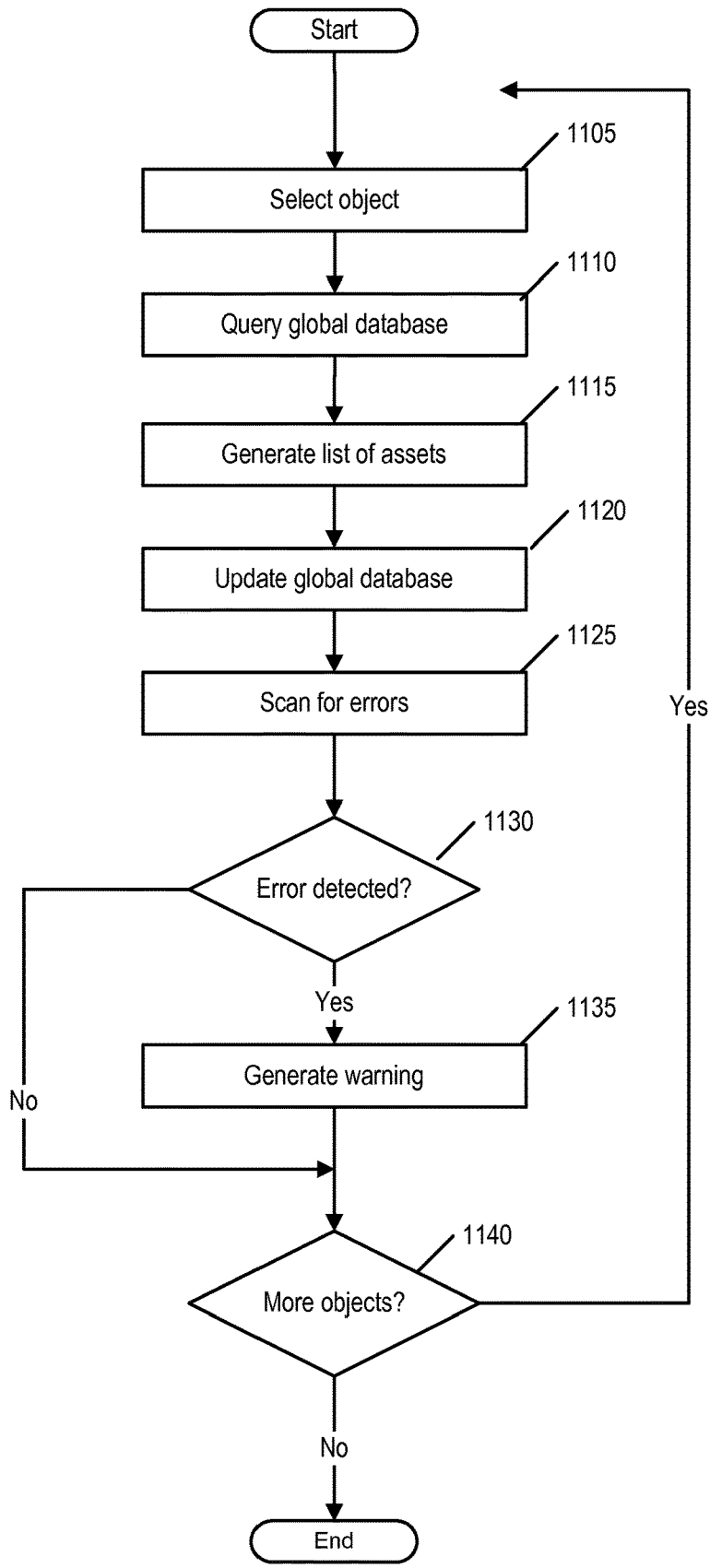
FIG. 11 is a flowchart illustrating an example process, according to the present description.

After the objects are selected, information identifying the selected objects is input to an assessment module. FIG. 11 is a flowchart illustrating an example process for performing DR assessment. The operations shown in FIG. 11 can be performed by an assessment module, such as assessment module 420 of FIG. 4. At 1105, the assessment module selects an object. In one embodiment, the assessment module accesses a list of DR enabled objects, selects the first DR enabled object in the list of DR enabled objects, and traverses the list in order.

At 1110, the assessment module queries a store of configuration data, such as global infrastructure database 450 of FIG. 4. Specifically, the assessment module accesses infrastructure data 455. At 1115, the assessment module generates a list of assets that the selected object depends on. These assets should be present in any recovery site to which the selected object could be failed over. An partial list of assets than can be associated with an object includes, for example, one or more of the following: application data file paths; virtual machine virtual disk paths; application servers; virtual machine hypervisors; virtual machine NIC information; virtual machine IP information; mount points/drive letters; volume IDs; disk group/volume group names/IDs; disk IDs; replication object IDs such as replicated volumes/device groups, and the like; peer replication endpoints in each site; peer application servers; and peer virtual machine hypervisors.

After generating the list of assets that the selected object uses, the assessment module assesses the infrastructure databases at one or more recovery sites, and determines which recovery site or sites can be used for DR protection of the selected object. At 1120, the assessment module updates the global infrastructure database, specifically DR configuration data therein, such as DR configuration data 460 of FIG. 4. The list of objects, and recovery site, are linked to the selected object in the global infrastructure database.

At 1125, the assessment module scans for errors. In one embodiment, this involves comparing the configuration information determined during the assessment phase with configuration information generated during object configuration. If any errors or misconfiguration are detected, at 1130, the assessment module generates a warning, at 1135. A partial list of errors that can be detected includes, for example: replication schedule not properly set; more or fewer virtual machines/applications found than selected by the user; mount point/drive letter is already in use in the recovery site; incompatible virtual machine management tools; improper IP settings for virtual machines; and the like. At 1140, the assessment module determines whether more objects are being configured for DR. If so, the method returns to 1105.

Figure 12:
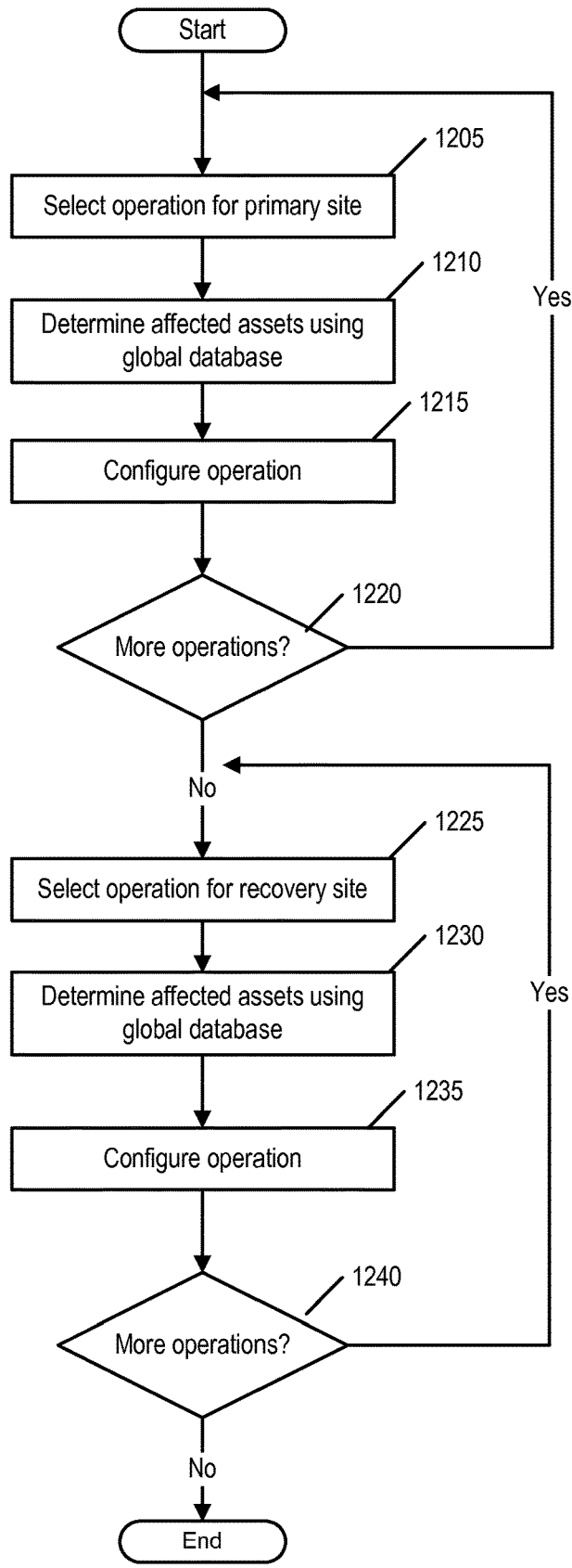
FIG. 12 is a flowchart illustrating an example process, according to the present description.

FIG. 12 is a flowchart illustrating an example process for generating a workflow, or run book, that can be used for DR operations. The workflow is based on the configuration information discovered by discovery modules such as discovery module 290 of FIG. 2 and discovery module 435 of FIG. 4. The operations shown in FIG. 12 can be performed by a resiliency manager, such as resiliency manager 410. Specifically, the operations can be performed by configuration module, such as configuration module 415 of FIG. 4.

At 1205, the configuration manager selects an operation for a primary site. For example, the configuration module can select the operation of shutting down one or more virtual machines at the primary site. At 1210, the configuration module determines assets affected by the selected operation. In one embodiment, this involves accessing a global infrastructure database, such as global infrastructure database 450 of FIG. 4. For example, shutting down a virtual machine can include any storage assets, network assets, and replication assets the virtual machine depends on.

At 1215, the configuration module configures the operation. For example, the configuration module generates a list of operations that apply to the assets affected by the selected operation. For example, shutting down a virtual machine can include reallocating, releasing, or redefining the various assets associated with the virtual machine. At 1220, the configuration module determines whether more operations at the primary site are included in the DR operation. If so, the operation returns to 1205. A partial list of steps for performing an operation in a primary site includes, for example: shutdown all the selected virtual machines; unregister the selected virtual machines; and unmount the datastore. These steps involve determining the virtual machine identifiers, the identifiers for the hypervisors that manage the virtual machines, and the identifiers for storage assets the virtual machines use.

At 1225, the configuration module selects an operation for a recovery site. For example, the configuration module can select an operation of provisioning a virtual machine. At 1230, the configuration module determines affected assets using the global infrastructure database. For example, provisioning a virtual machine can involve storage assets, network assets, and replication assets the virtual machine will depend on At 1235, the configuration module, configures the operation. For example, one or more prerequisite operations maybe involved in performing the operation. A partial list of steps for performing an operation in a recovery site includes, for example: validate the replication status and take appropriate steps to reverse the replication direction; mount the storage assets on the physical machines selected to host the virtual machines; register the virtual machines with the hypervisor hosts; reconfigure network settings for the virtual machines; start the virtual machines; and reconfigure network settings for the virtual machines. These steps involve determining replication settings, virtualization settings, storage settings, and network settings. At 1240, the configuration module determines whether more operations for the recovery site are involved in the DR operation. If so, the method returns to 1225.

Figure 13:
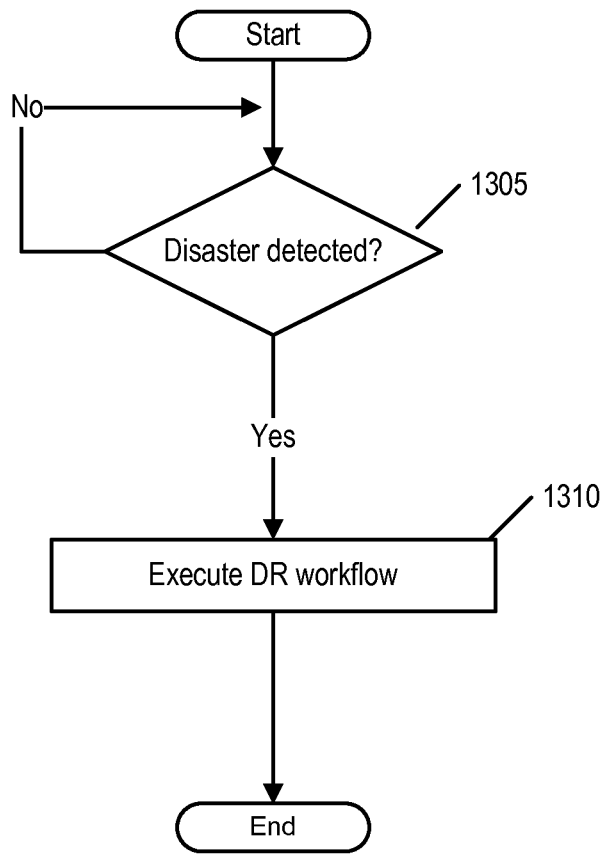
FIG. 13 is a flowchart illustrating an example process, according to the present description.

FIG. 13 is a flowchart illustrating an example process for performing a DR operation. The operations shown in FIG. 13 can be performed by a resiliency manager, such as resiliency manager 410 of FIG. 4. At 1305, the resiliency manager determines whether a disaster has been detected. While the term disaster is used, any event or occurrence that triggers a DR operation is included. At 1310, the resiliency manager executes a DR workflow, for example a DR workflow generated as described with regard to FIG. 12.

Figure 14:
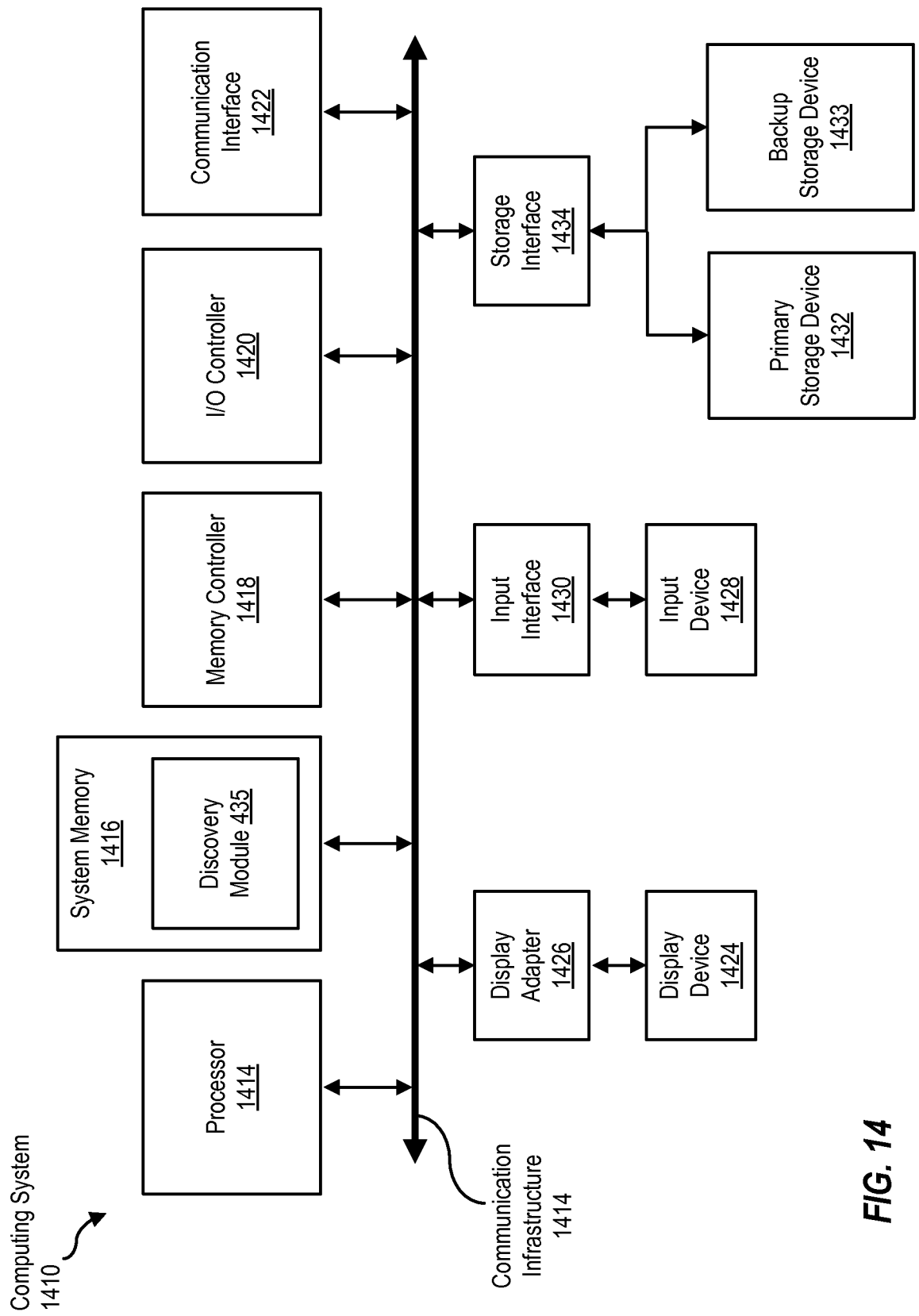
FIG. 14 is a block diagram of a computing system, according to the present description.

FIG. 14 is a block diagram of a computing system 1410 that includes a discovery module 435 for discovering DR configuration as described above. Computing system 1410 broadly represents any single or multi-processor computing device or system capable of executing computer-readable instructions. Examples of computing system 1410 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 1410 may include at least one processor 1414 and a system memory 1416. By executing the software that implements a discovery module 435, computing system 1410 becomes a special purpose computing device that is configured to perform discovery operations.

Processor 1414 generally represents any type or form of processing unit capable of processing data or interpreting and executing instructions. In certain embodiments, processor 1414 may receive instructions from a software application or module. These instructions may cause processor 1414 to perform the functions of one or more of the embodiments described and/or illustrated herein. For example, processor 1414 may perform and/or be a means for performing the operations described herein. Processor 1414 may also perform and/or be a means for performing any other operations, methods, or processes described and/or illustrated herein.

System memory 1416 generally represents any type or form of volatile or non-volatile storage device or medium capable of storing data and/or other computer-readable instructions. Examples of system memory 1416 include, without limitation, random access memory (RAM), read only memory (ROM), flash memory, or any other suitable memory device. Although not required, in certain embodiments computing system 1410 may include both a volatile memory unit (such as, for example, system memory 1416) and a non-volatile storage device (such as, for example, primary storage device 1432, as described in detail below). In one example, program instructions executable to implement a discovery module 435 (e.g., as shown in FIG. 4) may be loaded into system memory 1416.

In certain embodiments, computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an Industry Standard Architecture (ISA), Peripheral Component Interconnect (PCI), PCI express (PCIe), or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412. In certain embodiments, memory controller 1418 may perform and/or be a means for performing, either alone or in combination with other elements, one or more of the operations or features described and/or illustrated herein.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434.

Communication interface 1422 broadly represents any type or form of communication device or adapter capable of facilitating communication between computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1422 may also allow computing system 1410 to engage in distributed or remote computing. For example, communication interface 1422 may receive instructions from a remote device or send instructions to a remote device for execution.

As illustrated in FIG. 14, computing system 1410 may also include at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer, as known in the art) for display on display device 1424.

As illustrated in FIG. 14, computing system 1410 may also include at least one input device 1428 coupled to communication infrastructure 1412 via an input interface 1430. Input device 1428 generally represents any type or form of input device capable of providing input, either computer or human generated, to computing system 1410. Examples of input device 1428 include, without limitation, a keyboard, a pointing device, a speech recognition device, or any other input device.

As illustrated in FIG. 14, computing system 1410 may also include a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a floppy disk drive, a magnetic tape drive, an optical disk drive, a flash drive, or the like. Storage interface 1434 generally represents any type or form of interface or device for transferring data between storage devices 1432 and 1433 and other components of computing system 1410.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14.

Computing system 1410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1410 for storage in memory via a network such as the Internet or upon a carrier medium.

The non-transitory computer-readable medium containing the computer program may be loaded into computing system 1410. All or a portion of the computer program stored on the non-transitory computer-readable medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1410 may be configured as an application specific integrated circuit (ASIC) adapted to implement one or more of the embodiments disclosed herein.

Figure 15:
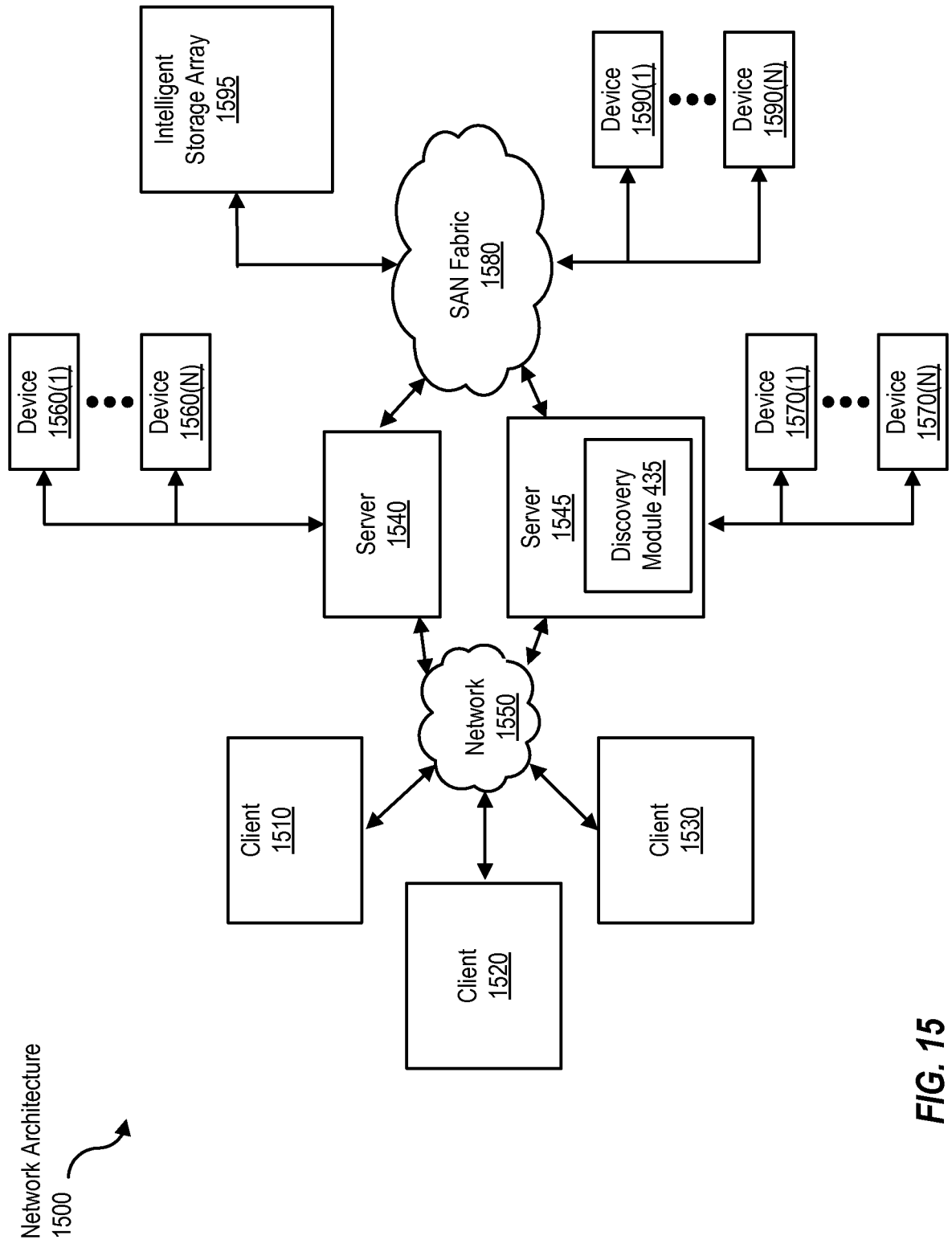
FIG. 15 is a block diagram of a networked computing system, according to the present description.

FIG. 15 is a block diagram of a network architecture 1500 in which client systems 1510, 1520, and 1530 and servers 1540 and 1545 may be coupled to a network 1550. Client systems 1510, 1520, and 1530 generally represent any type or form of computing device or system, such as computing system 1410 in FIG. 14.

Similarly, servers 1540 and 1545 generally represent computing devices or systems, such as application servers or database servers, configured to provide various database services and/or run certain software applications. Network 1550 generally represents any telecommunication or computer network including, for example, an intranet, a wide area network (WAN), a local area network (LAN), a personal area network (PAN), or the Internet. In one example, one or more of servers 1540 and 1545 and/or client systems 1510, 1520, and 1530 may include discovery module 435 as shown in FIG. 4.

As illustrated in FIG. 15, one or more storage devices 1540(1)-(N) may be directly attached to server 1540. Similarly, one or more storage devices 1570(1)-(N) may be directly attached to server 1545. Storage devices 1540(1)-(N) and storage devices 1570(1)-(N) generally represent any type or form of storage device or medium capable of storing data and/or other computer-readable instructions. In certain embodiments, storage devices 1540(1)-(N) and storage devices 1570(1)-(N) may represent network-attached storage (NAS) devices configured to communicate with servers 1540 and 1545 using various protocols, such as Network File System (NFS), Server Message Block (SMB), or Common Internet File System (CIFS). Such storage devices can store advisory metadata, non-advisory metadata, and file system objects, as described above.

Servers 1540 and 1545 may also be connected to a storage area network (SAN) fabric 1580. SAN fabric 1580 generally represents any type or form of computer network or architecture capable of facilitating communication between multiple storage devices. SAN fabric 1580 may facilitate communication between servers 1540 and 1545 and a plurality of storage devices 1590(1)-(N) and/or an intelligent storage array 1595. SAN fabric 1580 may also facilitate, via network 1550 and servers 1540 and 1545, communication between client systems 1510, 1520, and 1530 and storage devices 1590(1)-(N) and/or intelligent storage array 1595 in such a manner that devices 1590(1)-(N) and array 1595 appear as locally attached devices to client systems 1510, 1520, and 1530. As with storage devices 1540(1)-(N) and storage devices 1570(1)-(N), storage devices 1590(1)-(N) and intelligent storage array 1595 generally represent any type or form of storage device or medium capable of storing data and/or other computer-readable instructions.

In certain embodiments, and with reference to computing system 1410 of FIG. 14, a communication interface, such as communication interface 1422 in FIG. 14, may be used to provide connectivity between each client system 1510, 1520, and 1515 and network 1550. Client systems 1510, 1520, and 1530 may be able to access information on server 1540 or 1545 using, for example, a web browser or other client software. Such software may allow client systems 1510, 1520, and 1530 to access data hosted by server 1540, server 1545, storage devices 1540(1)-(N), storage devices 1570(1)-(N), storage devices 1590(1)-(N), or intelligent storage array 1595. Although FIG. 15 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 1540, server 1545, storage devices 1540(1)-(N), storage devices 1570(1)-(N), storage devices 1590(1)-(N), intelligent storage array 1595, or any combination thereof. All or a portion of one or more of the embodiments disclosed herein may also be encoded as a computer program, stored in server 1540, run by server 1545, and distributed to client systems 1510, 1520, and 1530 over network 1550.

In some examples, all or a portion of one of the systems in FIGS. 1, 14, and 15 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
    automatically discovering infrastructure information regarding a first object, wherein the first object is an application or virtual machine, and
        the infrastructure information identifies one or more assets upon which the first object depends for performance of one or more operations;
    storing the discovered infrastructure information in a database;
    generating disaster recovery (DR) configuration information for the first object based on
        the discovered infrastructure information stored in the database, wherein
        the configuration information is arranged in a uniform object dependency format including an identification of the one or more assets upon which the object depends, and
        the one or more assets on which the first object depends are arranged in the uniform object dependency format according to layers, wherein the layers include
            a virtualization layer identifying the first object,
            a replication layer identifying a configuration of replication assets upon which the first object depends, if any,
            a network layer identifying a configuration of network assets upon which the first object depends, if any, and
            a storage layer identifying a configuration of storage assets upon which the first object depends, if any;
    storing the DR configuration information in the database;
    creating a disaster recovery workflow based on the DR configuration information, wherein the disaster recovery workflow comprises an operation for shutting down the first object at a primary site, and an operation for provisioning the first object at a recovery site;
    detecting a failure occurring at the primary site, wherein the primary site includes a plurality of objects including the first object; and
    in response to detecting the failure occurring at the primary site, executing the disaster recovery workflow to restart the first object and the one or more assets at the recovery site.

2. The method of claim 1, wherein the creating comprises querying the database.

3. The method of claim 1, wherein the automatically discovering is performed in response to an expiration of a period of time.

4. The method of claim 1, further comprising:
    detecting an error; and
    issuing a warning.

5. The method of claim 1, wherein the database comprises DR configuration information from a plurality of recovery sites.

6. The method of claim 1, further comprising transmitting the DR configuration information to an orchestrator.

7. A non-transitory computer readable storage medium comprising program instructions executable to perform a method comprising:
    automatically discovering infrastructure information regarding a first object, wherein
        the first object is an application or virtual machine, and
        the infrastructure information identifies one or more assets upon which the first object depends for performance of one or more operations;
    storing the discovered infrastructure information in a database;
    generating disaster recovery (DR) configuration information based on the discovered infrastructure information stored in the database, wherein
        the configuration information is arranged in a uniform object dependency format including an identification of the one or more assets upon which the first object depends, and
        the one or more assets on which the first object depends are arranged in the uniform object dependency format according to layers, wherein the layers include
            a virtualization layer identifying the first object,
            a replication layer identifying a configuration of replication assets upon which the first object depends, if any,
            a network layer identifying a configuration of network assets upon which the first object depends, if any, and
            a storage layer identifying a configuration of storage assets upon which the first object depends, if any;
    storing the DR configuration information in the database;
    creating a disaster recovery workflow based on the DR configuration information, wherein the disaster recovery workflow comprises an operation for shutting down the first object at a primary site, and an operation for provisioning the first-object at a recovery site;
    detecting a failure occurring at the primary site, wherein the primary site includes a plurality of objects including the first object; and
    in response to detecting the failure occurring at the primary site, executing the disaster recovery workflow to restart the first object and the one or more assets at the recovery site.

8. The non-transitory computer readable storage medium of claim 7, wherein the creating comprises querying the database.

9. The non-transitory computer readable storage medium of claim 7, wherein the automatically discovering is performed in response to an expiration of a period of time.

10. The non-transitory computer readable storage medium of claim 7, further comprising:
  detecting an error; and
  issuing a warning.

11. The non-transitory computer readable storage medium of claim 7, wherein the database comprises DR configuration information from a plurality of recovery sites.

12. The non-transitory computer readable storage medium of claim 7, further comprising transmitting the DR configuration information to an orchestrator.

13. A system comprising:
  one or more processors; and
  a memory coupled to the one or more processors, wherein the memory stores program instructions executable by the one or more processors to perform a method comprising:
  automatically discovering infrastructure information regarding a first object, wherein
    the first object is an application or virtual machine, and
    the infrastructure information identifies one or more assets upon which the first object depends for performance of one or more operations;
  storing the discovered infrastructure information in a database;
  generating disaster recovery (DR) configuration information based on the discovered infrastructure information stored in the database, wherein
    the configuration information is arranged in a uniform object dependency format including an identification of the one or more assets upon which the object depends, and
    the one or more assets on which the first object depends are arranged in the uniform object dependency format according to layers, wherein the layers include
      a virtualization layer identifying the first object,
      a replication layer identifying a configuration of replication assets upon which the first object depends, if any,
      a network layer identifying a configuration of network assets upon which the first object depends, if any, and
      a storage layer identifying a configuration of storage assets upon which the first object depends, if any;
  storing the DR configuration information in the database;
  creating a disaster recovery workflow based on the DR configuration information, wherein the disaster recovery workflow comprises an operation for shutting down the first object at a primary site, and an operation for provisioning the first-object at a recovery site;
  detecting a failure occurring at the primary site comprising a plurality of virtual machines, wherein
    the primary site includes a plurality of objects including the first object; and
  in response to detecting the failure occurring at the primary site, executing the disaster recovery workflow to restart the first object and the one or more assets at the recovery site.

14. The system of claim 13, wherein the automatically discovering is performed in response to an expiration of a period of time.

* * * * *